United States Patent
Li

(10) Patent No.: US 7,162,077 B2
(45) Date of Patent: Jan. 9, 2007

(54) PALETTE-BASED IMAGE COMPRESSION METHOD, SYSTEM AND DATA FILE

(75) Inventor: Xin Li, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 652 days.

(21) Appl. No.: 10/269,645

(22) Filed: Oct. 11, 2002

(65) Prior Publication Data

US 2003/0076993 A1    Apr. 24, 2003

Related U.S. Application Data

(60) Provisional application No. 60/348,036, filed on Oct. 19, 2001.

(51) Int. Cl.
*G06K 9/00* (2006.01)

(52) U.S. Cl. ............... 382/166; 382/162; 382/165; 382/232

(58) Field of Classification Search ............ 382/162, 382/166, 232, 242, 165, 194; 345/591, 589, 345/593, 600, 601; 348/590; 375/240.1
See application file for complete search history.

(56) References Cited

U.S. PATENT DOCUMENTS

| 4,799,053 | A | * | 1/1989 | Van Aken et al. | 345/601 |
|---|---|---|---|---|---|
| 4,825,390 | A | * | 4/1989 | Van Aken et al. | 345/600 |
| 5,218,432 | A | * | 6/1993 | Wakeland | 348/590 |
| 5,600,373 | A | * | 2/1997 | Chui et al. | 375/240.1 |
| 6,023,558 | A |   | 2/2000 | Grabowski | 396/20 |
| 6,326,977 | B1 | * | 12/2001 | Westerman | 345/591 |
| 6,771,813 | B1 | * | 8/2004 | Katsuyama | 382/165 |

FOREIGN PATENT DOCUMENTS

JP    405290154 A    * 11/1993

OTHER PUBLICATIONS

M. J. Weinberger, "The LOCO-1 lossless image compression algorithm: principles and standardization into JPEG-LS", IEEE Trans. on Image Proc., vol. 9, No. 8, pp. 1309-1324.
W. Zeng, "An efficient color reindexing scheme for palette-based compression", ICIP'2000.
A. Zaccarin and B. Liu, "A novel approach for coding color quantized images", IEEE Trans. on Image Processing, vol. 2, No. 4, pp. 442-453, 1993.
P. Ausbeck, "The piecewise-constant image model", *Proc. of IEEE*, vol. 88, No. 11, Nov. 2000.
V. Ratnaker, "RAPP: lossless image compression with runs of adaptive pixel patterns", in *Proc. of 32$^{nd}$ Asilomar Conf. Signals, System and Computers*, pp. 1251-1255, 1998.
Y. Yoo et al., "Embedded image domain compression", *Proc. of Int. Conf. on Image Process.*, Oct. 1999.
S. Forchhammer and O.R. Jensen, "Content layer progressive coding of digital maps", in *Proc. of Data Compression Conference*, 2000.

* cited by examiner

*Primary Examiner*—Anh Hong Do
(74) *Attorney, Agent, or Firm*—David C. Ripma

(57) ABSTRACT

A system and method involving the compression of palette-based color images. Compression is based upon coding for boundaries that exist in the original uncompressed image, where such boundaries effectively define a character of binary color differentiation between next-adjacent color zones, which differentiation can be expressed as N and not N, where N is one of the colors in the color palette of the original image.

7 Claims, 2 Drawing Sheets

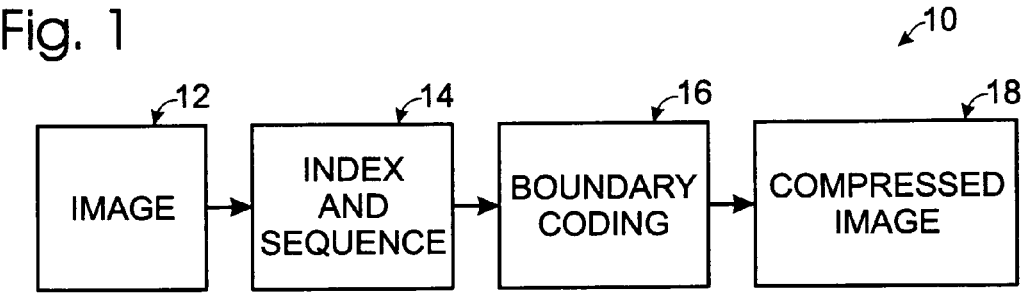
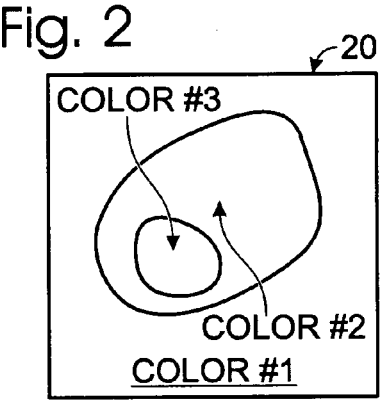

ALL RGB$_4$

RGB$_3$ (NOT RGB$_4$)    RGB$_4$

RGB$_2$ (NOT RGB$_3$)   RGB$_3$   RGB$_4$

RGB$_1$   RGB$_2$   RGB$_3$   RGB$_4$

PALETTE-BASED IMAGE COMPRESSION METHOD, SYSTEM AND DATA FILE

CROSS-REFERENCE TO RELATED APPLICATION

This application claims priority to still-pending, prior-filed U.S. Provisional Application Ser. No. 60/348,036, filed 10/19/2001 for "Systems and Methods for Compressing Palette-Based Images".

GENERAL INTRODUCTION

This invention pertains to color-image data compression, and in particular, to a color-boundary-based methodology and system (apparatus) for compressing palette-based color images.

Preferred and best-mode embodiments of the invention are described below in detail in conjunction with the accompanying drawings.

DESCRIPTION OF THE DRAWINGS

FIG. 1 is a simplified block/schematic diagram of a preferred embodiment of both a system (apparatus) and a method constructed for performance in accordance with the invention.

FIG. 2 is a simplified, schematic representation of a three-color, palette-based image compression (also referred to herein as an index image and as a resulting data file) which has been performed by the system and the methodology of the present invention.

FIGS. 3A–3F, inclusive, illustrate:

Figure 3C:
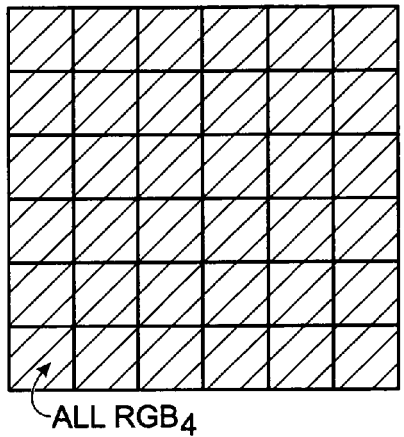

3A—a square, thirty-six-pixel, four-color, palette-based color image which has been selected for compression in accordance with practice of the present invention;

3B—a created uni-directionally increasing, hierarchical sequence derived from a histogram and based upon pixel frequency of the four-color palette which exists in the image of FIG. 3A;

FIGS. 3C–3F, inclusive,—symbolic representations of stages of both compression-based image coding, and subsequent image decoding, founded upon the present invention, showing how encodation for compression takes place for binary-level color-characteristic boundaries which can be expressed as boundaries that differentiate two different kinds of color zones, which zones are in the nature of N, and not N, where N is one of the colors in the image palette.

DETAILED DESCRIPTION OF THE INVENTION

1. Technical Environment

As stated above, this invention relates to a methodology and to a system for palette-based color-image data compression.

Currently, various approaches have been explored, and are employed, for the compression of images of the type above mentioned. For example, Graphics Interchange Format (GIF) [1] based on the known Lempel-Ziv algorithm is the most popular format for representing such types of images. Lempel-Ziv is a classical dictionary-based technique for universal compression of any type of data. New coding standards, like JPEG-LS [2], and JPEG2000 [3], use a context-based predictive model to characterize the spatial correlation in a palette-based image. These two coding standards often achieve significant bit savings over GIF compression. There also exist non-standard approaches, such as a piecewise constant model-based [4] approach. The bracketed numbers 1, 2, 3, 4 which appear in the beginning sentences of this paragraph relate to four technical references, as follows:

[1] K. Sayood, "Introduction to Data Compression", Second Ed., Academic Press '2000.

[2] M. J. Weinberger, "The LOCO-I lossless image compression algorithm: principles and standardization into JPEG-LS", IEEE Trans. on Image Proc., Vol.9, No.8, pp. 1309–1324.

[3] ISO/IEC JTC1/SC29 WG1, JPEG2000

[4] W. Zeng, "An efficient color reindexing scheme for palette-based compression", ICIP'2000.

Each of these references is hereby incorporated by reference as background environmental technical information in relation to the present invention. An additional reference which is in this same category is—A. Zaccarin and B. Liu, "Novel Approach for Coding Quantified Images", IEEE Trans. on Image Processing, Vol. 2, No. 4, pp. 442–453, 1993.

As will become apparent, the present invention digresses and differentiates significantly from such current, conventional practice.

Instead of resolving the uncertainty of the color for each pixel, this invention only spends bits to resolve the uncertainty of the boundary between different colors. Such a source model well matches computer-generated graphics in which a small number of colors exist and cluster around different regions. When the total number of distinct colors is N, the model of the invention can be viewed as decomposing the original image into an N binary map, with each map representing one color boundary. Consequently, existing bi-level image coding, such as JBIG, can easily be employed to compress such color boundaries.

Fundamentally, and speaking from a methodological point of view, the present invention proposes a method for compressing palette-based color images comprising the steps of: (a), from a histogram, determining the pixel frequency of each color in the palette for a selected image; (b), from this determination sorting the palette colors into a sequence in accordance with an ordered frequency hierarchy which is based upon a unidirectionally differentiated (increasing or decreasing) color frequency; and (c), on the basis of such determining and sorting, performing compression by coding the boundaries that exist between adjacent color zones of the types which are characterized by a selected type of binary differentiation. Preferably, the selected type of binary differentiation is one which can be expressed as being a boundary between adjacent zones in one of which the color is color N, and in the other one of which the color therein is not color N, where N is one of the colors in the image palette.

Still with reference to a similar methodological point of view regarding the invention, this invention differentiates from prior practice, among other ways, by proposing a compression method for palette-based color images which includes the steps of (a) selecting a palette-based color image for compression, (b) performing compression by treating the boundaries between adjacent, differentiated color zones in the image as bi-level (binary) images, and (c) coding for these boundaries.

From a systemic point of view, the system (and the included apparatus) of the present invention digress from the prior art by including the cooperative, interactive relationship between and including: (a) color indexing structure which is operable to establish a sorted sequence that describes a unidirectional (increasing or decreasing) hierarchy of image, pixel-color frequency; and (b) coding structure operatively associated with the indexing structure, operable, on the basis of the sorted sequence, to effect compression by coding the boundaries that exist between adjacent color zones in the image, which zones are characterized by a selected type (such as that mentioned immediately above) of binary differentiation.

2. Invention Description Details

Turning now to the drawings, and referring first of all to FIG. 1, here there is illustrated, in block form at 10, and in preferred and best-mode forms, both the system and the methodology of the present invention. In this view of the invention, block 12 represents a palette-based color image which has been selected for compression in accordance with the invention. Blocks 14, 16 represent both (a) the structures, and (b) the methodologic steps implemented thereby, of two, fundamental, structural and methodologic components that make up the invention. Block 14 represents the structure and the methodology for determining (indexing) and for sorting and sequencing hierarchically the color frequencies of the several palette-based colors which make up image 12. Block 16 represents the structure and the methodology for implementing what is referred to herein as binary-level coding regarding the boundaries between adjacent color regions, or zones, in accordance with the invention. Block 18 represents the finally compressed image, or color-image data file, which is also an important resulting contribution made by the present invention.

In relation to what is pictured in FIG. 1, the compression algorithm which implements the present invention includes two principal steps: (1) color indexing which generates the palette for any given image, and (2) successive coding of color boundaries which compresses the indexed image. The overall bit stream from compression, according to the invention, includes the palette (uncoded 24bits/color) and the compressed index image.

Regarding color indexing, the generation of a palette starts from a single computation of the color histogram. The beginning assumes that the empirical frequency of the nth color (1=n=N) will be $$f_n\left(\sum_{n=1}^{N} f_n = 1\right).$$

The sequence $\{f_1, f_2, \ldots, f_n\}$ is then sorted hierarchically, with each such nth color labeled by 1-N. Such histogram-based color indexing has been found to be superior to intensity-based indexing, and thus is the preferred approach for implementing the present invention. The several distinct colors in the palette ($R_n$, $G_n$, $B_n$) are packed into a compressed bit stream (index image) in an uncoded fashion. In total, 24N bits are allocated to represent the palette, ordered by their frequency counts. When N is not large, the overhead spent on the palette only takes a small portion of the overall bits.

3. Coding of the Index Image

With regard to coding, the index image is compressed by successively resolving the uncertainty of N color boundaries. The start involves coding the boundary between color #1 and color #n (>1), which essentially describes a bi-level image. Then, conditioned on the first boundary result, one only needs to resolve the uncertainty of the subset whose color # is >2. Thus the process continues by next coding the boundary between color #2 and color #n (>2). Repeatedly one can always refine the boundary between color #m and color #n>m conditioned on the results that the locations of those pixels whose color frequency is smaller than m are already known. In this fashion, the original index image is decomposed into N dependent bi-level images. It is easy to verify that such decomposition does not increase the source entropy. For example, and referring now to image 20 which appears in FIG. 2, when N is equal to three, as is shown in this figure, one knows from information theory that $H(p_1, p_2, p_3) = H(p_1, p_2+p_3) + (p_2+p_3)H(p_2/p_2+p_3, p_3/p_2+p_3)$, in which the two items on the right side of the equation separately denote the bits used by the first and the second color boundary.

It is easy to see that an image can be losslessly reconstructed from the above-described N-boundary decomposition (i.e. such decomposition preserves the information). Since all N boundaries can be viewed as bi-level images, an existing bi-level image coding standard, such as JBIG, can be readily employed for actual final compression. Nominally, the only latent concern lies in that the support of the bi-level image might not be rectangular for color #n–>1. However, here there is not that concern, inasmuch as the context-based adaptive binary arithmetic coding which this invention employs does not have difficulty handling non-rectangular regions. In this regard, one only needs to define context in the following way: any causal neighbor falling out of the non-rectangular region is treated as zero. The overall symbols generated by N color boundaries can be shown to be less than 2AB, where A and B are the height and width, respectively, of the index image. Therefore, the overall computational complexity of the present invention is relatively simple.

Compression performance can be further improved by exploiting the topological properties of N color regions. A region-clustering algorithm can be used to identify isolated regions with uniform color inside. It follows that a single bit denoting such an attribute for each isolated region is enough for accurate reconstruction of an image.

The below Table I gives comparative compressed image sizes relating the performance of the present invention to that of each of two conventional encoding and compression approaches.

TABLE I

| Image | N: # of colors | JPEG-LS | JPEG2000 | The Invention |
|-------|----------------|---------|----------|---------------|
| A     | 8              | 1580    | 1462     | 991           |
| B     | 12             | 5983    | 7423     | 2268          |
| C     | 7              | 8294    | 5915     | 2935          |
| D     | 5              | 2435    | 2571     | 1529          |
| E     | 8              | 1613    | 1192     | 943           |

Again referring to FIG. 1, one can see that the steps of the invention include, first of all, determining (indexing) the color palette of image 12, and then creating an individually hierarchical sequence (preferably declining unidirectionally in value) of the specific, color-component, frequency occurrences (numbers of pixels). This is followed by locating and coding for the boundaries which exist between divided, binary-level images that are characterized by a sequenced hierarchy of pixel color frequencies in the several color zones. Coding is performed in a manner whereby, with respect to each such boundary, color N is on one side of the boundary, and all colors which are not N are located on the other side of the boundary. $N_1$ is the color with the highest frequency. This boundary locating/coding activity progresses so that, with regard to that collection of not-N colors, the one among them which has the next highest frequency, $N_2$, is boundary-divided from all remaining colors which are not $N_2$, and so on throughout the entirety of the created hierarchical sequence.

Referring now to FIGS. 3A–3F, and beginning with FIG. 3A, practice of the invention is herein illustrated with regard to a representative square, thirty-six-pixel, pallet-based image 22 which has a color palette made up with four colors RGB (red, green, blue)1, RGB2, RGB3 and RGB4. Each of the thirty-six pixels in image 22 is designated in FIG. 3A by color, with only several of the pixels being labeled with a full color designator, such as RGB 1. The other pixels are simply labeled with numbers 1, 2, 3 or 4.

FIG. 3B presents the histogram-determined hierarchical sequence of pixel color frequencies in image 22. These frequencies (f) are set forth in a unidirectional, declining-value manner from f (RGB4) which has 21-occurrences (the highest frequency), through f (RGB3) which has 6-occurrences, thence through f (RGB2) which has 5-occurrences, and finally to f (RGB1) which has the lowest frequency of 4-occurrences.

FIGS. 3C–3F, inclusive, illustrate staged boundary encoding as performed by the invention. These same four figures can also be viewed as representing how decompression (decoding) of an invention-compressed image can essentially losslessly take place to recreate original image 22.

FIG. 3C illustrates a precursor activity involving assigning the highest-frequency color (RGB4) to all thirty-six pixels.

Figure 3D:
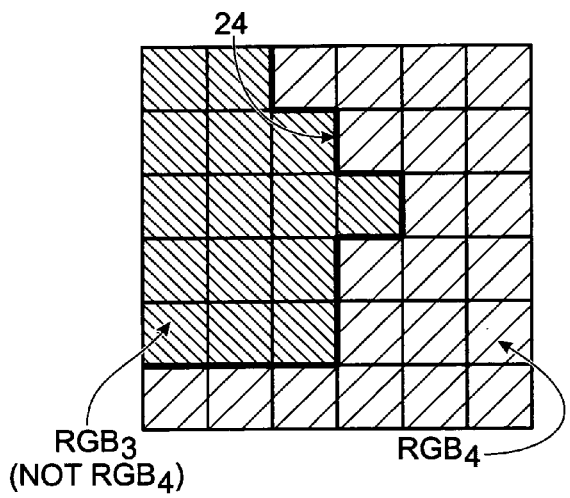

FIG. 3D illustrates boundary location and encoding (or decoding during decompression) of the binary boundary 24, the heavy dark line, which exists between color RGB4 (previously mentioned color $N_1$) and all remaining other colors (RGB3, RGB2 and RGB 1) which are not RGB4. Clearly one can see that boundary 24 essentially characterizes a two-color-zone differentiation in a binary-level manner.

Figure 3E:
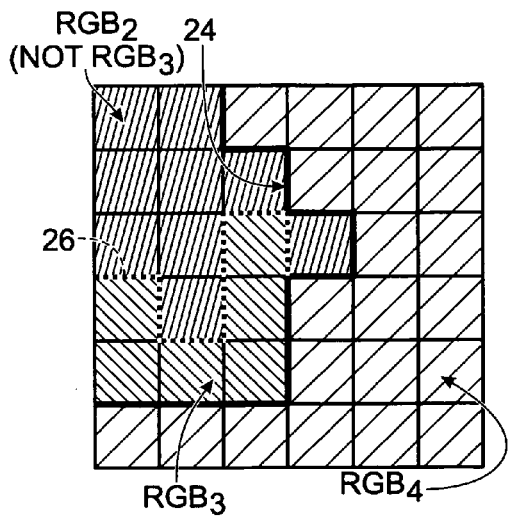

In FIG. 3E, another binary-defining encodeable boundary 26, the dashed line, separates the zone of color RGB3 (from FIG. 3D) from all remaining other colors (RGB2 and RGB1) which are not RGB3.

Figure 3F:
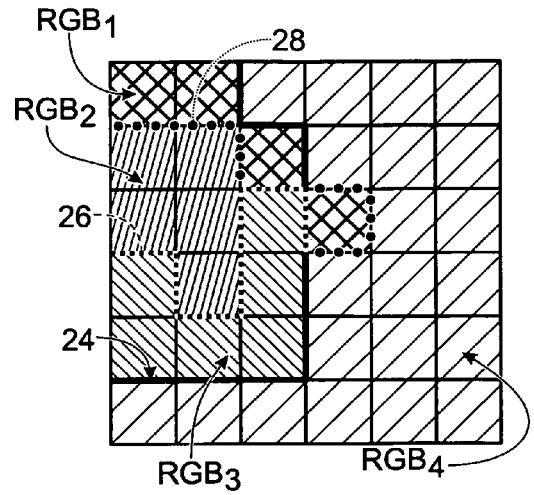

FIG. 3F shows still a further binary-defining encodeable boundary 28, the dotted line, which separates the zone of color RGB2 (from FIG. 3E) from the one remaining other color RGB1, which is not RGB2.

From the text presented above, and considering the structure of a compressed-color-image data file which is also a part of this invention, that file can be seen to be describable and characterizable as being: a compressed, palette-based, color-image data file which includes (a) a collection of binary-related boundary data which is associated with original image boundaries that exist between pairs of adjacent, differently colored image zones, and (b) a structural quality in such boundary data, whereby the adjacent color zones on opposite sides of each boundary are binary-related by the color characteristics N and not N, where N is one of the colors in the color palette of the original image.

From a thoughtful review taken from the encodation point of view, binary boundary coding can thus be seen to progress in a hierarchical sequential order that relates to successive boundaries, each of which lies as a singular divider between two differentiated color zones, in one of which zones all corresponding pixels in the original selected image have the same color N, and in the other of which zones all corresponding pixels in the original image have another color which is not N. Preferably, the pixel frequency of the color not-N has a value which is either the same as, or on one numeric side (preferably the lower-value side) of, the pixel frequency of the color N.

A significant "end-result" feature flowing from practice of this invention is made visibly quite evident in a situation, for example, where a binary boundary-coded image is communicated over the Internet and decoded for viewing in the window of a Web browser. From the viewer's perspective, the "being decoded" image appears to bloom all at once as a whole-field image, progressing rapidly from a first, "modest-detail", but nonetheless fully readable, "all-over" image, to one wherein initially absent pixel-color details are fully filled in. Such a presentation is quite different from the conventional "carpet-roll-out" unfolding and presentation of conventionally encoded and decoded images.

The invention is thus now fully described and illustrated. It offers a unique structure, and a unique methodology, for efficiently and effectively compressing a pallet-based color image. It does so in an essentially lossless and non-entropy-increasing manner. Color frequencies, based upon histogramic information, are employed to define a unidirectional, hierarchical sequence of the different frequency counts. Successively then, the boundaries between N and not N pairs of colors in the sequence are found, and compression encodation takes place in a binary fashion regarding these boundaries. Decoding and de-compressing occur in a somewhat like, reverse manner.

It will thus be evident how compression, and in fact restructuring or rebuilding (uncompressing), of an image which is dealt with in accordance with the present invention, is very easily handled by performing compression that is based upon binary color differentiating boundary characteristics between regions possessing different palette-based colors.

Accordingly, while preferred embodiments of the system and method of this invention have been illustrated and described herein, variations and modifications are certainly possible, and may be made without departing from the spirit of the invention.

I claim:

1. A method for compressing a selected, palette-based color image comprising:
   determining the pixel frequency of each color in the image's palette;
   sorting the palette colors into an ordered, unidirectionally increasing or decreasing, differentiated color-frequency sequence; and
   on the basis of said determining and sorting, performing compression by treating boundaries between adjacent, differentiated color zones as boundaries dividing bi-level, binary-differentiated images, and by coding for these boundaries.

2. The method of claim 1, wherein said sorting involves creating a sequence based upon progressively decreasing color frequency.

3. The method of claim 1, wherein said coding for boundaries progresses in a hierarchical sequential order that relates to successive boundaries, each of which lies as a singular zone-divider between two differentiated color zones, in one of which zones all corresponding pixels in the original selected image have the color N, and in the other of which zones all corresponding pixels in the original image have another color which is not N.

4. The method of claim 3, wherein the color N has a pixel frequency f (N), and the not-N other color has a pixel frequency f (not-N) whose value is either the same as, or on one numeric side of, the value of f(N).

5. The method of claim 4, wherein the mentioned one numeric side is the lower-value side.

6. The method of claim 1, wherein binary differentiation between two adjacent color zones is expressed as a boundary between color N and not color N, where N is one of the colors in the image palette.

7. The method of claim 6, wherein a not color N zone may include more than one color in the palette.

* * * * *